United States Patent [19]

Pedersen

[11] 3,873,569

[45] Mar. 25, 1975

[54] COMPLEXES OF A MACROCYCLIC POLYETHER WITH ONE OR MORE SULFUR-BEARING COMPOUNDS

[75] Inventor: Charles John Pedersen, Salem, N.J.

[73] Assignee: E. I. du Pont de Nemours and Company, Wilmington, Del.

[22] Filed: Nov. 27, 1970

[21] Appl. No.: 93,424

[52] U.S. Cl. ............ 260/340.3, 252/182, 260/79.5, 260/92.3, 260/96.5 S, 260/144, 260/309.6, 260/338

[51] Int. Cl. .......................................... C07d 19/00

[58] Field of Search ................................ 260/340.3

[56] References Cited
UNITED STATES PATENTS 3,546,318  12/1970  Vest ............................. 260/340.3 X 3,580,889  5/1971  Barney et al ................. 260/340.3 X

FOREIGN PATENTS OR APPLICATIONS 1,455,518  11/1961  France
671,840    2/1939   Germany ....................... 260/340.3

*Primary Examiner*—Donald G. Daus
*Assistant Examiner*—James H. Turnipseed

[57] ABSTRACT

A complex of (A) an organic sulfur-bearing compound and (B) a macrocyclic polyether having a 15–60 carbon and oxygen ring and 1–4 fused carbocyclic rings; the ratio of A:B being about 1:1 to about 6:1. The complex can be used as a curing component for vulcanization of sulfur-curable elastomers.

5 Claims, No Drawings

COMPLEXES OF A MACROCYCLIC POLYETHER WITH ONE OR MORE SULFUR-BEARING COMPOUNDS

BACKGROUND

This invention relates to macrocyclic polyethers and complexes thereof. More specifically this invention relates to macrocyclic polyether complexes with organic sulfur-bearing compounds and the use of these complexes as components of a vulcanization system for sulfur-curable elastomers.

Vulcanizing sulfur-curable elastomers is a very complicated process requiring precise control of the vulcanization rate and ultimate cure for each application contemplated for the elastomer composition. Curing is affected by reaction of the numerous components in the elastomer recipe, their solubility in the elastomer, the heat generated in milling the compounds into the elastomer, the heat and time required to activate the various compounds for curing, and other factors. Thus, effective curing components which can be used to control vulcanization, which have good solubility in various elastomers and which provide easy processability are needed. The complexes of this invention meet such needs and provide a new versatility in vulcanization of sulfur-curable elastomers.

SUMMARY OF THE INVENTION

Complexes of macrocyclic polyethers and cationic metallic compounds are known, but it has now been discovered that particular macrocyclic polyethers from complexes with neutral organic sulfur-bearing compounds. Certain of these new complexes function as vulcanization components. They produce a faster cure with higher modulus, tensile, and elongation for a given curing time when compared to the uncomplexed sulfur-bearing compound. Thus, the complexes of this invention offer, not only greater versatility in compounding, but also more effective curing.

According to this invention there is provided a complex of (A) an organic sulfur-bearing compound, and (B) a macrocyclic polyether compound consisting of a macrocyclic ring of carbon and oxygen atoms totaling 15–60 ring atoms, the oxygen atoms in the ring being separated by links of two or three carbon atoms, said macrocyclic ring being fused to one to four carbocyclic rings from the groups (a) phenylene, naphthylene, phenanthrylene, and anthrylene; (b) hydrogenated analogs of (a); and (c) substituted derivatives of (a) and (b) wherein the substituents are halo, nitro, amino, azo, alkyl, aryl, aralkyl, alkoxy, cyano, hydroxy, carboxy, and sulfo. The ratio of sulfur-bearing compound (A) to the macrocyclic polyether (B) can range from about 1:1 to about 6:1.

Mixing the complex of this invention with sulfur-curable elastomer produces a composition which can be vulcanized by the application of heat.

DESCRIPTION OF THE INVENTION

Macrocyclic polyethers which can be used to form the complexes of this invention are described in articles by C. J. Pedersen in the Journal of the American Chemical Society at 89; 7017 (1967) and 92:2; 391 (1970). The shorthand nomenclature for the polyethers set out in these articles will be used herein to refer to the macrocyclic polyethers generically as "Crown" compounds and the complexes formed therefrom as "Crown Complexes."

Such crown compounds can be prepared by one of several chemical reaction methods. One method involves sequential reactions to "build" a particular crown compound by adding various links and reactive chemical groups as substantially linear chains attached to a starting group such as carbocyclic ring. In this method the chains are cyclized to form the crown. Symmetrical crowns can be easily made by cyclizing starting group having one substantially linear chain with another such group. Methods of preparing crowns are described in French Pat. No. 1,440,716 and British Pat. No. 1,149,229.

In preparing crown compounds the sequence of chemical reactions and reaction conditions must be developed to produce the particular crown configuration desired. Reactions and reaction conditions to add the desired links and reactive groups are within the skill of the artisan and can be developed into a sequence to produce the desired crown with the information disclosed in the references cited above.

The precise method by which the crown complexes of this invention are formed, i.e. the chemical structure, is not fully understood. Complexes of the organic sulfur-bearing compounds and crown compounds of this invention can be formed by several methods. The exact chemical structure is not critical and can vary according to the particular crown, sulfur-bearing compound, ratio of crown and compound, and method of formation. Relative size, configuration, and presence of reactive groups of both crown and sulfur-bearing compound determine complexing ability and structure of a particular complex. Due to the nature of preferred sulfur-bearing compounds, crown compounds of less than 15 ring atoms do not readily form complexes with these compounds. Steric hindrance can also inhibit complex formation.

Crown compounds having a macrocyclic ring of 15–60 carbon atoms, and preferably more than 16 ring atoms, are of particular interest in preparing complexes of this invention. These crowns exhibit good complexing ability with a wide range of sulfur-bearing compounds. A preferred group of crown compounds have 18 or more ring atoms; these compounds exhibit good complexing ability, as well as good activity as vulcanization components when complexed with sulfur-bearing compounds. Crown compounds for this invention can also be classified by the number of oxygen atoms in the macrocyclic ring; a preferred group having five or more oxygen atoms exhibits good complexing ability with the sulfur-bearing compounds.

As used herein to describe the crown compounds of this invention, the term "fused" refers to the structure by which a carbocyclic ring and the macrocyclic ring of the crown are attached. This term does not describe or limit the manner by which the crown is formed or by which other rings and substituents are attached to the crown. Fused rings of the crown compounds of this invention have two vicinial carbon atoms of the fused carbocyclic ring common to the macrocyclic ring of the crown. One or more carbocyclic rings and substituent groups can be attached to the crown in any compatible manner which does not prevent use of the crown in forming complex suitable for a sulfur-curing activator. The carbocyclic ring or rings can be unsaturated, partially hydrogenated, or completely hydrogenated. Substituents which can be attached to a carbocyclic ring include halo, nitro, amino, azo, alkyl, aryl, aralkyl, alkoxy, cyano, hydroxy, carboxy, and sulfo groups. Substituents which can be attached to a particular crown will be limited by the structure of the crown compound, the method or sequence of reactions used to form the crown, and compatibility of the crown and substituents with the intended complex and use.

The crown compounds comprise a series of carbon chain inks of 2 to 3 carbon atoms connected by oxygen atoms; thus, the basic crown compound is a cyclic polyether. At least one of the carbon atom links consist of the fused carbocyclic ring atoms discussed above. The other carbon link atoms can be either 2 or 3 carbon atoms with hydrogen atoms thereon (i.e. methylene groups) or carbon atoms with other compatible substituents. Both links of 3 and 3 carbon atoms can be present in a crown.

Organic sulfur-bearing compounds which are useful for forming complexes of this invention have utility as rubber chemicals. Such organic sulfur-bearing compounds are referred to commonly and herein as sulfur-bearing compounds. These sulfur-bearing compounds, such as thioureas and substituted thioureas, are vulcanizing agents for elastomers.

Chemically, sulfur-bearing compounds useful in forming the complexes of this invention can be described as aliphatic, aromatic, and heterocyclic hydrocarbon sulfur-bearing compounds. Such compounds come from the classes thioureas, thiobenzamides, and thiocarbazides. Substituted thioureas having one alkyl, aryl, or alkylene hydrocarbon substituent and substituted thioureas having two alkyl substituents on one nitrogen atom are included in the above class or thioureas. Substituted amides of aromatic thioacids having one alkyl substituent on the nitrogen atom are included in the above class of thiobenzamides. Substituted thiosemicarbazides having one aryl substituent on a nitrogen atom are included in the above class of thiosemicarbazides. Preferred alkyl substituents have from 1 to 20 carbon atoms and preferred aryl substituents have from 6 to 22 carbon atoms. Other substituent groups which do not substantially interfere with complex formation or vulcanization using the complex can be present on the alkyl and aryl groups of the sulfur-bearing compounds.

Examples and the structure of compounds within the above sulfur-bearing compound classes include:

A. thioureas:

1. thiourea 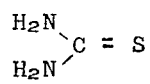

2. ethylenethiourea
   (2-mercaptoimidazoline) 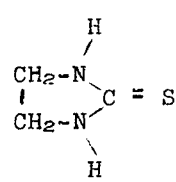

B. thiobenzamides:

1. thiobenzamide

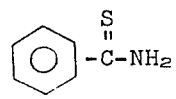

C. thiosemicarbazides:

1. thiosemicarbazide:

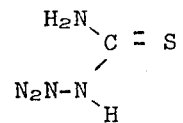

2. 4-phenylthiosemicarbazide

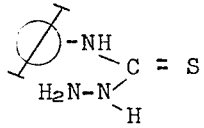

3. 1-phenylthiosemicarbazide

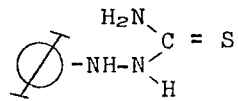

Other compounds and substituted compounds from these groups can be used which complex with crown compounds of this invention. Preferred compounds include thiourea, 2-mercaptoimidazoline, thiobenzamide, thiosemicarbazide, N-phenylthiourea, and 4-phenylthiosemicarbazide because these compounds most readily form complexes.

There are several methods for preparing the complexes of this invention. In a preferred method the sulfur-bearing compound and crown compound are precipitated in the desired ratios from a saturated solution by a slight decrease in temperature. The ratio of the crown compound to the sulfur-bearing compound as precipitated in the complex depends upon the ability of the compounds to complex, the solubility of each and the ratio of the two compounds before precipitation. Any solvent which will dissolve the compounds and does not react or prevent complex formation is suitable, such as methanol. The ratio of the two or more compounds can be varied by varying the complex formation conditions pointed out above. Complexes having a molar ratio of sulfur-bearing compound to crown compound in the range of about 1:1 to about 6:1 can be readily formed by the above method.

Other methods of forming complexes of this invention include:

1. Crown compound and sulfur-bearing compound or compounds are dissolved in a solvent which dissolves each and the solvent is removed by evaporation, usually under vacuum, leaving the complex.

2. Crown compound is heated with sulfur-bearing compound in a solvent in which only the latter is readily soluble, the crown compound being converted into complex without the system ever becoming a clear solution. The complex is recovered by filtration.

3. Crown compound is warmed and thoroughly mixed with the sulfur-bearing compound forming a complex by blending the dry compounds without a solvent.

The crown complexes of this invention are useful components for vulcanizing sulfur-curable elastomers. The precise nature of the chemical reaction by which these complexes function is not fully understood. Changes associated with vulcanization are complex and have not yet been completely chemically defined. Due to the great variety of compounds employed in sulfur-vulcanization and in overlapping functions of the sulfur and sulfur-bearing compounds, the role of each component is difficult to determine. However, it is evident that the complexes of this invention serve to improve the rate of cure, modulus, compression set, and other vulcanizate properties. This improvement is shown by comparing identically prepared portions of a sulfur-curable elastomer. A complexed sulfur-bearing compound of this invention is used in one portion. Identical sulfur-bearing compound in uncomplexed form is used in the other portion. Higher cure rate, higher modulus, and lower compression set are illustrated by Examples 11 and 12 for two crown complexes in polychloroprene and styrene/1,3-butadiene rubbers.

Sulfur-curable elastomers which can be used with the crown complexes of this invention are generally elastomeric polymers having ethylenic unsaturation which can be cross-linked under vulcanization conditions by sulfur and sulfur-bearing compounds. Such sulfur-curable elastomers are known in the art. For purposes of this invention the sulfur-curable elastomers must have a minimum level of ethylenic unsaturation for a practical vulcanization rate and extent of vulcanization. This minimum level is about 0.1 gm. mole of ethylenic unsaturation per kilogram of elastomer. This value is commonly expressed as $C = C/Kg$ of elastomer and is calculated based on one of several methods for standard unsaturation determination. Methods for determining ethylenic unsaturation are described in U.S. Pat. No. 3,063,933 to Gladding et al. (using iodine absorption) and U.S. Pat. No. 3,365,418 to Nyce et al. (using bromine absorption). For a good vulcanization rate preferred sulfur-curable elastomers have unsaturation levels on the order of at least 0.5 $(C = C)/Kg$ of elastomer.

Sulfur-curable elastomers which can be used with the crown complexes of this invention include styrene/butadiene, polymers, ethylene/($C_3$–$C_8$)α-olefin/($C_6$–$C_{22}$) non-conjugated diene polymers, polybutadiene, butyl rubber, acrylonitrile rubber, polyisoprene, natural rubber, unsaturated polyurethane, and polychloroprene. Such elastomers are described in the Kirk-Othmer Encyclopedia of Chemical Technology, 2nd edition, Interscience Publishers, New York, under "elastomers" and "rubber" and in the Encyclopedia of Polymer Science and Technology, (1964), Interscience Publishers, New York. Preferred elastomers from this group are the ethylene/($C_3$–$C_8$)α-olefin/($C_6$–$C_{22}$) non-conjugated diene polymers, styrene/butadiene polymers, and polychloroprene. The ethylene/($C_3$–$C_8$)α-olefin/($C_6$–$C_{22}$) non-conjugated diene polymers are from a class of polymers commonly noted as EPDM elastomers and illustrated by an ethylene/propylene/1,4-hexadiene elastomer. EPDM is defined at pages 678–679 of Part 28 of the 1966 Book of ASTM Standards (April 1966). Such elastomers are described in U.S. Pat. No. 3,278,480 to Radcliff. Styrene/butadiene polymers are illustrated by styrene/1,3-butadiene copolymers commonly known as the SBR rubbers and illustrated by SBR-1500 which contains about 23.5 percent styrene and is made by "cold" polymerization (6°C.). Polychloroprene is not normally considered a sulfur-curable rubber, but it can be used with the complexes of this invention and is illustrated by an elastomer marketed as Neoprene. Polyurethanes are described in United States Pat. No. 2,808,391 to Pattison. Other elastomers which are not commonly classed as sulfur-curable can be used with the complexes of this invention if sufficient unsaturation is introduced into the elastomer either by chemical means or by polymerizing a minor proportion of a monomer which would introduce unsaturation, such as a diene.

For vulcanization using the complexes of this invention other compatible agents can be used, such as particulate fillers, modifiers, extenders, curing agents, antioxidants, etc. Due to the extensive list and combination of such compounds, compatibility and proportions for each agent in the compounding recipe must be determined for each combination. This determination is within the skill of the artisan with minimum experimentation.

Mixing and vulcanizing the complexes of this invention with elastomer can be accomplished by one of several conventional, well-known methods. Mixing can be accomplished by dispersing the complex in elastomer in latex form or by compounding. Compounding involves mechanically blending materials of the recipe in a conventional sequence. A roll-mill, Banbury mill, or other conventional machinery can be used for blending the materials. Compounded elastomer can be formed, molded, extruded, or otherwise shaped as desired. It can be cured with the application of heat or heat and pressure to the desired state of cure as determined by the particular vulcanizate properties desired according to well-known methods.

The following examples illustrate the invention. Parts, percentages, ratios, and concentrations are by weight unless otherwise indicated, except for ratios of compounds in complexes which are molar ratios.

EXAMPLE 1

Preparation of (Dibenzo-15-crown-5). Thiourea (1:1 molar)

A one-gram (0.00316 mol) portion of 2,3,8,9-dibenzo-1,4,7,10,13-pentaoxacyclopentadeca-2,8-diene (Dibenzo-15-crown-5) is added to 17 ml. of a saturated methanol solution containing 1.65 grams (0.025 mol) of thiourea. The resulting mixture is heated to boiling and the clear hot solution which results is filtered hot and allowed to stand at room temperature for 90 minutes. The crystals of the 1:1 molar complex which form in the cold solution are collected, washed with cold methanol, and dried in a vacuum oven at 40°C.

Analysis yields the following data:

| | Found for Product | | Calc'd for $(C_{18}H_{20}O_5)$ . $(CH_4N_2S)$ |
|---|---|---|---|
| %C: | 58.5, | 58.5 | 58.2 |
| %H: | 6.0, | 6.0 | 6.1 |
| %N: | 6.9, | 7.0 | 7.1 |
| %S: | 8.4, | 8.53 | 8.2 |
| Melting Point | 114 – | 115°C. | * |

*Melting points for: crown itself, 106–107°C.; thiourea, 180–182°C.

EXAMPLE 2

Preparation of (Benzo-15-crown-5) · 4 (Thiourea) (1:4 molar)

A 3-gram (0.0112 mols) portion of 2,3-benzo-1,4,7,10,13-pentaoxacyclopentadeca-2-ene (Benzo-15-crown-5) is added to 50 milliliters of a methanol solution containing 4.85 grams (0.065 mol) of thiourea. The resulting mixture is heated on a steam bath until all solids have dissolved, filtered hot, and allowed to cool. The white crystals which separate are washed with methanol and dried.

Analysis yields the following:

| | Found for Product | Calc'd for $(C_{14}H_{20}O_5) \cdot 4 (CH_4N_2S)$ |
|---|---|---|
| %C: | 38.1 | 37.7 |
| %H: | 6.2 | 6.3 |
| %N: | 19.6 | 19.6 |
| %S: | 22.6 | 22.4 |
| Melting Point: | 152–164°C | * |

*Melting points for crown itself, 77–78°C.; thiourea, 180–182°C.

EXAMPLE 3

Preparation of (Bisbutylbenzo-18-crown-6) · 6 Thiourea (1:6 molar)

Substitution of 2,3,11,12-bis(tert-butyl benzo)-1,4,7,10,13,16-hexaoxacyclooctadeca-2,11-diene (Bisbutylbenzo-18-crown-6) in place of 2,3-benzo-1,4,7,10,13-pentaoxacyclopentadeca-2-ene in the procedure of Example 2 gives white crystals of the 1:6 molar complex.

Analysis yields the following data:

| | Found for Product | Calc'd for $(C_{28}H_{40}O_6) \cdot 6 (CH_4N_2S)$ |
|---|---|---|
| %C: | 52.9, 43.1 | 44.0 |
| %H: | 6.9, 7.0 | 6.9 |
| %N: | 16.1, 16.3 | 18.1 |
| %S: | 20.3, 20.5 | 20.7 |
| Melting Point: | 178–180°C | * |

*Melting points for crown itself, 132–134°C.; thiourea, 180–182°C.

EXAMPLE 4

Preparation of (Dicyclohexyl-18-crown-6) · 6 Thiourea (1:6 molar)

A warm solution of 20 grams (0.263 mol) of thiourea in 60 ml. of methanol and a solution of 14.8 grams (0.0397 mol) of a mixture of cis, trans isomers of 2,5,8-,15,18,21-hexaoxatricyclo [20.4.0.0$^{9,14}$] hexacosane (Dicyclohexyl-18-crown-6) are mixed together with good stirring; the resulting slurry of white crystals is then cooled by ice water and filtered. The collected crystals of the 1:6 molar complex are washed with cold methanol and dried.

Analysis yields the following data:

| | Found for Product | Calc'd for $(C_{20}H_{36}O_6) \cdot 6 (CH_4N_2S)$ |
|---|---|---|
| %C: | 37.1, 37.3 | 37.7 |
| %H: | 6.7, 6.8 | 7.2 |
| %N: | 20.4, 20.6 | 20.3 |

-Continued

| | Found for Product | Calc'd for $(C_{20}H_{36}O_6) \cdot 6 (CH_4N_2S)$ |
|---|---|---|
| %S: | 24.9, 24.9 | 23.2 |
| Melting Point: | 175–176°C. | * |

*Melting points for crown itself, 68.5–69.5°C.; thiourea 180–182°C.

The 1:5 complexes with thiourea of cis, trans isomers of dicyclohexyl-18-crown-6 melt as follows:

| | | | complex m.p. |
|---|---|---|---|
| cis | isomer | m.p. 61–62°C. | 172–178°C. |
| trans | isomer | m.o. 69–70°C.) | 197–200°C. |

EXAMPLE 5

A. Preparation of 2,3-Benzo-11,12-tetramethylene-1,4,7,10 13,16-hexaoxacyclooctadeca-2-ene (Benzo-cyclohexyl-18-crown-6)

A one-liter stainless steel autoclave is charged with 150 grams of 2,3,11,12-dibenzo-1,4,7,10,13,16-hexaoxacyclooctadeca-2,11-diene (Dibenzo-18-crown-6), 28 grams of sodium chloride (in 80 ml. water), 250 ml. methanol, and 20 grams of catalyst (5 percent Ru on Al$_2$O$_3$). Hydrogenation at 100°C. and 500 psig is continued until 2.4 gram-mols of hydrogen have been taken up. The autoclave is cooled, hydrogen is vented, and the contents are removed and filtered. Concentration under vacuum gives a residue which is then extracted with 300 ml. of hot n-hexane; concentration of the soluble fraction (A) under vacuum gives a viscous liquid (fraction A) and some unreacted crown. The hexane-insoluble fraction is dissolved in 300 ml. hot benzene; the decanted solution is concentrated under vacuum to a white sticky solid. This residue is washed with 500 ml. methanol and filtered free of white crystals; the filtrate is concentrated and the concentrate extracted with hot hexane. The hexane-insoluble fraction (B) and fraction A are combined to give fraction C. C is chromatographed on a 4¼ in.I.D. x 9½ in. column of acid-washed Al$_2$O$_3$. The first two 70-ml. n-hexane eluates are discarded; the next four 70 ml. eluates are concentrated to give a colorless viscous liquid (the desired product) having a number-average molecular weight (boiling point elevation) of 386; it analyzes 65.4 percent C. and 8.8 percent H by weight.

B. Preparation of (Benzo-cyclohexyl-18-crown-6) · Thiourea (1:6 and 1:5 molar)

An 0.815 gram (0.00223 mol) portion of 2,3-benzo-11,12-tetramethylene-1,4,7,10,13,16-hexaoxacyclooctadeca-2-ene prepared by the procedure of Part A above is mixed at room temperature with 15 ml. of methanol saturated with thiourea (1.45 grams of thiourea; 0.0195 mol). Crystals separate. After 30 minutes the crystals are filtered away, washed with methanol, and dried yielding the 1:6 molar complex.

Analysis yields the following data:

| Found for Product | | Calc'd for $C_{20}H_{30}O_6 \cdot 5$ (CH$_4$N$_2$S) |
|---|---|---|
| %C: | 37.8, 38.0 | 37.9 |
| %H: | 6.4, 6.6 | 6.6 |
| %N: | 20.3, 20.5 | 20.4 |
| %S: | 23.7, 23.9 | 23.4 |
| Melting Point | 178 – 183°C. | — |

The filtrate from which the 1:6 complex is isolated deposits a second crop of white crystals, the 1:5 complex.

Analysis yields the following values:

| Found for Product | | Calc'd for $C_{20}H_{30}O_6 \cdot 5$ (CH$_4$N$_2$S) |
|---|---|---|
| %C: | 41.4, 41.6 | 40.2 |
| %H: | 6.5, 6.6 | 6.7 |
| %N: | 17.7, 17.7 | 18.8 |
| %S: | 21.6, 21.7 | 21.5 |
| Melting Point: | 164 – 185°C. 167 – 174°C. | — |

EXAMPLE 6

Preparation of Benzo-15-crown-5 · 2 Thiobenzamide

A 1.253-gram (0.00915 mol) portion of thiobenzamide is mixed with 1.23 grams (0.0046 mol) of 2,3-benzo-1,4,7,10,13-pentaoxacyclopentadeca-2-ene in 10 ml. of methanol. The resulting yellow solution is allowed to evaporate at 25°C. The solid yellow residue obtained is triturated with 5 ml. of cold methanol, filtered, washed with 5 ml. of cold methanol, and dried. The 1:2 molar complex is obtained as bright yellow crystals.

Analysis yields the following data:

| Found for Product | | Calc'd for $(C_{14}H_{20}O_5)$ · 2($C_7H_7NS$) |
|---|---|---|
| %C: | 61.4, 61.4 | 62.0 |
| %H: | 5.5, 5.7 | 6.3 |
| %N: | 5.0, 5.1 | 5.2 |
| %S: | 12.3, 12.4 | 11.8 |
| Melting Point | 81 – 82°C. | * |

*Melting points for : crown itself, 77–78°C.; thiobenzamide, 115–116°C.

EXAMPLE 7

Preparation of (Dicyclohexyl-18-crown-6) · 2(N-φ-thiourea) (1:2 molar)

A mixture of 1.52 grams (0.01 mol) of N-phenylthiourea and 3.8 grams (0.01 mol) of 2,5,8,15,1-8,21-hexaoxatricyclo [20.4.0.0$^{9,14}$] hexacosane (Dicyclohexyl-18-crown-6) in 60 ml. of methanol is warmed on a steam bath. The copious white precipitate which appears is separated after the mixture has been cooled. The crystals are washed with methanol and dried.

Analysis yields the following data:

| Found for Product | Calc'd for $(C_{20}H_{36}O_6) \cdot 2$ $(C_7H_8N_2S)$ |
|---|---|
| %C: 60.0 | 60.3 |

| Found for Product | Calc'd for $(C_{20}H_{36}O_6) \cdot 2$ $(C_7H_8N_2S)$ |
|---|---|
| %H: 7.6 | 7.7 |
| %N: 8.3 | 8.3 |
| %S: 9.8 | 9.5 |
| Melting Point: 179–180°C. | * |

*Melting points for : crown itself, 68.5–69.5°C.; N-phenylthiourea, 154°C.

EXAMPLES 8–9

Preparation of (Dicyclohexyl-18-crown-6) · (1-φ-thiosemicarbazide) or 2(4-φ-thiosemicarbazide) (1:n molar)

A mixture of 3.72 grams (0.098 mol) of 2,5,8,15,18,-21-hexaoxatricyclo [20.4.0.0$^{9,14}$] hexacosane (Dicyclohexyl-18-crown-6) and 1.67 grams of 1 (or 4-) phenyl thiosemicarbazide (n = 1 and 2 molar respectively) is warmed in 25 ml. of methanol until a solution is obtained. On cooling, large white crystals of the complex (1:n) settle out. Analysis yields the data given below for the respective complexes:

| | Found for Product | | Calc'd for | |
|---|---|---|---|---|
| | Ex. 8 (1-φ) | Ex. 9 (4-φ) | $(C_{20}H_{36}O_6).n$ | $(C_7H_9N_2S)$ |
| | (N = 1) | (n = 2) | n = 1 | n = 2 |
| %C: | 60.3 | 57.9 | 60.1 | 57.8 |
| %H: | 8.4 | 7.8 | 8.4 | 7.6 |
| %S: | 6.0 | 8.8 | 5.9 | 9.1 |
| Melting point: | 155–165°C | 144–146°C | * | * |

*Melting points for : crown itself, 68.5–69.5°C.; 1-φ thiosemicarbazide, 200–201°C.; 4-φ thiosemicarbazide, 140°C.

EXAMPLE 10

Preparation of (Dicyclohexyl-18-crown-6) · 2 (2-mercaptoimidazoline) (1:2 molar)

The general procedure of Examples 8–9 is followed using 1.02 grams (0.0086 mol) of the crown compound and substituting 3.72 grams (0.01 mol) of 2-mercaptoimidazoline for 1 or 4 φ-thiosemicarbazide. Hard white crystals of the 1:2 molar complex are obtained.

Analysis yields the following values:

| Found for Product | Calc'd for $(C_{20}H_{36}O_6) \cdot 2$ $(C_3H_6N_2S)$ |
|---|---|
| %C: 51.1 | 51.2 |
| %H: 7.4 | 7.5 |
| %N: 4.7 | 4.6 |
| %S: 21.3 | 21.0 |
| Melting Point: 125–127°C. | * |

*Melting point for : crown itself, 68.5–69.5°C.; 2-mercaptoimidazoline, above 195°C.

EXAMPLE 11

A. Polychloroprene

Polychloroprene is prepared by persulfate catalyzed mercaptan-modified emulsion polymerization of 2-chloro-1,3-butadiene at 40°C. It has a Mooney viscosity (ML 1+2.5 at 100°C.) of about 50.

B. Use of (Dicyclohexyl-18-crown-6) complexes

Three stocks A-C containing the polychloroprene are compounded on a rubber roll mill according to the recipes given in the table below. Stocks A and B correspond to the invention. Stock C is a control outside the invention provided merely for purpose of comparison, thiourea is present, without the crown.

| Component | Parts by Weight |
|---|---|
| Polychloroprene | 100 |
| Stearic acid | 0.5 |
| MgO ("Maglite D") | 4 |
| N-phenyl-α-naphthylamine | 2 |
| Medium thermal black | 100 |
| Aromatic Petroleum Oil ("Sundex 790") | 12 |
| ZnO | 5 |
| Curing additive (prepared as in Ex. 4 & 7) | (see table below) |

Stocks A-C are cured for 25 minutes at 152.8°C. (307°F.).

EXAMPLE 12

Curing SBR

A. Styrene/1,3-Butadiene Copolymer Rubber [SBR-1500]

This sulfur-curable elastomer (SBR-1500), made by copolymerizing 1,3-butadiene and styrene, contains about 23.5 percent by weight. Its Mooney Viscosity (ML 1+4/100°C.) is about 50–52. The designation 1500 is in accordance with ASTM Method D-1419-61 T. The polymerization is carried out continuously in a continuous water phase at 6°C. using emulsifiers, viscosity regulators, and a redox catalyst system, in a manner known to the art-skilled.

B. Use of (Dicyclohexyl-18-crown-6) Crown complexes

Three stocks A-C containing SBR-1500 are compounded on a rubber roll mill according to the recipes

STOCKS

| Additive | A | B | C+ |
|---|---|---|---|
| Type | CP$_2$* | CT$_6$** | Thiourea |
| Amount (phr) | 0.93*** | 0.69*** | 0.39 |
| ODR (inch-lbs):**** | | | |
| at 0 min. cure time | 2 | 2 | 2 |
| 5 min. cure time | 7 | 2 | 2 |
| 10 min. cure time | 37 | 8 | 5 |
| 20 min. cure time | 53 | 23 | 13 |
| (Δ ODR Torque/Δ t)max | 7.2 | 1.5 | 0.85 |
| Vulcanizate Properties:***** | | | |
| Modulus at 100% Ext. (psi) | 400 | 300 | 250 |
| Modulus at 200% Ext. (psi) | 950 | 700 | 550 |
| Tensile Strength (psi) | 1775 | 1550 | 1050 |
| Extension at break (%) | 315 | 360 | 325 |
| Permanent Set at Break (%) | 1 | 4.5 | 7 |
| Compression Set (%) (22 hrs. at 70°C.) | 12 | 29 | 66 |

+control.
*(Dicyclohexyl-18-crown-6) . 2(Phenylthiourea) (Prepared as in Example 7)
**(Dicyclohexyl-18-crown-6) . 6(Thiourea) (Prepared as in Example 4)
***Contains 0.39 gram of complexed thiourea
****ODR (oscillating disc rheometer) results indicate rate of cure of compounded stock for tests using a commercial ODR such as a Monsanto Oscillating Disc Rheometer described in an "Operation and Service Manual" of the Monsanto Chemical Company, St. Louis, Missouri. The test procedure is described in an article by G. E. Decker, R. W. Wise, and D. Guerry in "Rubber Chemistry and Technology," 36 pp. 451–458 (1963) and in U.S. Pat. 3,523,927 to Shaw. Briefly, ODR measures relative viscosity of an elastomer by oscillating a grooved biconical disc through an arc while pressed tightly between two test pieces. Torque required to oscillate the disc is recorded as the viscosity and curing is indicated by a rise in viscosity.
*****Vulcanizate Properties are determined by the following ASTM methods:

| | |
|---|---|
| Mooney Viscosity | ASTM D-1646–67 |
| Modulus Tensile Strength Extension at Break | ASTM D-412–66 |
| Compression Set | ASTM D-395–67 (Method B) |
| Permanent Set at Break | ASTM D-412–66 (Section 5.5 modified by use of a 5 minute hold time). | given in the table below. Stocks A and B correspond to the invention. Stock C is a control for Stock B and is outside the invention; thiourea is present, but the crown is absent.

| Component | Parts by Weight |
|---|---|
| SBR | 100 |
| High abrasion furnace black | 50 |
| Di-o-tolyguanidine salt of dicatechol borate ("Permalux") | 6 |
| ZnO | 3 |
| MgO ("Maglite D") | 2 |
| Sulfur | 2 |
| Curing additive (Prepared as in Ex. 4 & 7) | (see table below) |

Stocks A-C are cured for 20 minutes at 150°C.

| | STOCKS | | |
|---|---|---|---|
| | A | B | C+ |
| Additive | | | |
| Type | CP$_2$* | CT$_6$** | Thiourea |
| Amount (phr) | 8.9*** | 3.6*** | 2 |
| ODR (inch-obs): | | | |
| at 0 min. cure time | 0 | 7 | 5 |
| 5 min. cure time | 16 | 9 | 6 |
| 10 min. cure time | 32 | 15 | 7 |
| 20 min. cure time | 46 | 33 | 9 |
| 30 min. cure time | 53 | 50 | 12 |
| ($\Delta$ ODR Torque/$\Delta$ t)max. | 3.9 | 1.9 | 0.26 |
| Vulcanizate Properties at 25°C | | | |
| Modulus at 100% Ext. (psi) | 300 | 200 | 70 |
| Modulus at 200% Ext. (psi) | 775 | 400 | 75 |
| Tensile Strength (psi) | 2675 | 1860 | 120 |
| Extension at Break (%) | 440 | 550 | 610 |
| Permanent Set at Break (%) | 20 | 30 | 192 |
| Compression Set (%) (22 hrs. at 70°C) | 47 | 72 | 89 |

+ control
* (Dicyclohexyl-18-crown-6) · 2 (Phenylthiourea)(Prepared as in Example 7)
** (Dicyclohexyl-18-crown-6) · 6 (Thiourea) (Prepared as in Example 4)
*** contains 2 grams of complexed thiourea Vulcanizate Properties are determined according to ASTM methods as set out in Example 11.

I claim:

1. A complex of (A) a thiourea and (B) a macrocyclic polyether having a macrocyclic ring of carbon and oxygen atoms totaling 15–60 ring atoms, each oxygen in the ring being separated from its adjoining oxygens in the ring by 2 or 3 carbon atoms, and the macrocyclic ring being fused by a pair of vicinal carbon atoms to 1–4 carbocyclic rings of the group: (a) phenylene, naphthylene, phenanthrylene, and anthrylene, (b) saturated analogs of (a), and (c) monosubstituted derivatives of (a) wherein the substituent is tertiary butyl.

2. A complex of claim 1 wherein the molar ratio of A:B is about 1:1 to about 6:1.

3. A complex of claim 1 wherein the macrocyclic polyether has at least 5 oxygen atoms in the macrocyclic ring and the links consist of 2 carbon atoms.

4. A complex of claim 1 wherein the sulfur-bearing compound is N-phenylthiourea.

5. (Dicyclohexyl-18-crown-6)·2(N-phenylthiourea).

* * * * *